(12) United States Patent
Lokatt et al.

(10) Patent No.: US 11,508,244 B2
(45) Date of Patent: Nov. 22, 2022

(54) METHOD, COMPUTER PROGRAM PRODUCT, SYSTEM AND CRAFT FOR COLLISION AVOIDANCE

(71) Applicant: SAAB AB, Linkoeping (SE)

(72) Inventors: Mikaela Lokatt, Lidingoe (SE); Stefan Blom, Saltsjoebaden (SE)

(73) Assignee: SAAB AB, Linkoeping (SE)

( * ) Notice: Subject to any disclaimer, the term of this patent is extended or adjusted under 35 U.S.C. 154(b) by 0 days.

(21) Appl. No.: 17/249,561

(22) Filed: Mar. 5, 2021

(65) Prior Publication Data

US 2021/0287552 A1   Sep. 16, 2021

(30) Foreign Application Priority Data

Mar. 13, 2020   (SE) .................................. 2000053-5

(51) Int. Cl.
*G08G 3/02*     (2006.01)
*G05D 1/10*     (2006.01)
(Continued)

(52) U.S. Cl.
CPC .............. *G08G 3/02* (2013.01); *B63B 79/40* (2020.01); *G01C 21/203* (2013.01);
(Continued)

(58) Field of Classification Search
CPC ........ G08G 3/02; G08G 5/0047; G05D 1/106; G05D 1/0206; B63B 79/40; G01C 21/203
See application file for complete search history.

(56) References Cited

U.S. PATENT DOCUMENTS 8,467,953 B2   6/2013   Naderhirn
9,014,880 B2   4/2015   Durling et al.
(Continued)

FOREIGN PATENT DOCUMENTS

CN   103730031 B      9/2015
CN   113838309 A  *  12/2021  ........... G08G 5/0013
(Continued)

OTHER PUBLICATIONS

European Patent Office, Extended European Search Report received for Application No. 21161824.4, dated Jul. 13, 2021, 10 pages, Germany.
(Continued)

*Primary Examiner* — Frederick M Brushaber
*Assistant Examiner* — Elizabeth Yang
(74) *Attorney, Agent, or Firm* — Alston & Bird LLP

(57) ABSTRACT

The present disclosure relates to a method for determining an action for collision avoidance in a craft. The method (100) comprises obtaining (110) object data comprising three-dimensional object data points (420); obtaining (120) state data of the craft (260); determining (140) at least one set of manoeuvre paths (410*a,b,c*) for the craft (260) based on the obtained craft state data; determining (150) a set of distance thresholds (421) for the three-dimensional object data points (420) based on the object data; comparing (160) each set of manoeuvre paths (410*a,b,c*) with the object data and the set of distance thresholds (421), wherein the set of manoeuvre paths (410*a,b,c*) is identified as a colliding set of manoeuvre paths (410*a,b,c*) when each path of the set of manoeuvre paths (410*a,b,c*) is at least partially within the corresponding distance threshold (421) of at least one three-dimensional object data point (420); and determining (170) an action upon identification of at least one colliding set of manoeuvre paths (410*a,b,c*).

14 Claims, 6 Drawing Sheets

(51) Int. Cl.
  *B63B 79/40*  (2020.01)
  *G01C 21/20*  (2006.01)
  *G05D 1/02*   (2020.01)
  *G08G 5/00*   (2006.01)
  *G08G 5/04*   (2006.01)

(52) U.S. Cl.
  CPC ........... *G05D 1/0206* (2013.01); *G05D 1/106* (2019.05); *G08G 5/0047* (2013.01); *G08G 5/045* (2013.01)

(56) References Cited

U.S. PATENT DOCUMENTS

| | | | |
|---|---|---|---|
| 10,854,097 B2 * | 12/2020 | Flotte | H04L 67/12 |
| 2008/0033648 A1 * | 2/2008 | Kelly | G08G 5/04 |
| | | | 701/301 |
| 2010/0076685 A1 * | 3/2010 | Eidehall | G01S 13/931 |
| | | | 342/357.31 |
| 2010/0121503 A1 | 5/2010 | Sundqvist | |
| 2010/0292871 A1 | 11/2010 | Schultz et al. | |
| 2011/0288773 A1 * | 11/2011 | Hoy | G08G 5/045 |
| | | | 701/301 |
| 2017/0102707 A1 | 4/2017 | Reichel et al. | |
| 2017/0248421 A1 | 8/2017 | Cope et al. | |
| 2018/0040251 A1 * | 2/2018 | Navot | G08G 5/0021 |
| 2018/0196436 A1 | 7/2018 | Gupta | |
| 2018/0268725 A1 * | 9/2018 | Gadgil | G01C 23/00 |
| 2019/0072966 A1 | 3/2019 | Zhang et al. | |
| 2019/0088146 A1 | 3/2019 | Salesse-Lavergne | |
| 2020/0062417 A1 | 2/2020 | Prosser et al. | |
| 2020/0286394 A1 * | 9/2020 | Rueff | G05D 1/044 |

FOREIGN PATENT DOCUMENTS

| | | |
|---|---|---|
| EP | 1240636 A1 | 9/2002 |
| WO | WO 2018/094374 A1 | 5/2018 |

OTHER PUBLICATIONS

Swedish Patent and Registration Office, Office Action, including Search Report, received for Application No. 2000053-5, dated Sep. 4, 2020, 9 pages, Sweden.

* cited by examiner

METHOD, COMPUTER PROGRAM PRODUCT, SYSTEM AND CRAFT FOR COLLISION AVOIDANCE

CROSS-REFERENCE TO RELATED APPLICATIONS

This application claims priority to Swedish Application No. 2000053-5, filed Mar. 13, 2020, the contents of which are hereby incorporated herein in its entirety by reference.

TECHNICAL FIELD

The present disclosure relates to a method and system for determining an action for collision avoidance in a craft. The disclosure also relates to a computer program product to perform the method and to a craft comprising such a system.

BACKGROUND

Throughout the history of aviation, controlled flight into terrain has been a major cause of fatal accidents. In response to this concern, the aviation industry developed the ground proximity warning systems (GPWS), which warned pilots if the aircraft was in proximity to terrain. This system became a mandatory installation for large aircraft in 1974 and accidents have decreased significantly.

Although GPWS was very successful, it was limited in that it was only able to detect terrain directly below the aircraft. If there is a sharp change in terrain, GPWS does not detect the aircraft closure rate until it is too late for evasive action. To overcome this limitation, a more advanced technology, known as Enhanced Ground Proximity Warning (EGPWS) was introduced. This technology combines a worldwide digital terrain database with an accurate navigation system, ideally using the Global Positioning System. The aircraft's position is compared with a database of the Earth's terrain; if there is a discrepancy, pilots receive a timely caution or warning of terrain hazards. This enhanced system provides a warning in advance of steeply rising ground and also extends the warning area almost to the runway threshold, overcoming the limitations of GPWS.

The EGPWS is also widely known as Terrain Awareness Warning System or TAWS. EGPWS/TAWS systems are a critical component during low visibility operations and during approach and landing. Numerous studies have aimed to understand if there are identifiable human factors issues within accidents that do occur and, as a secondary investigation, the effects of degraded GPWS/EGPWS/TAWS (if any). Analysis of factors leading to the flight into terrain accidents indicate multiple human performance deficiencies and undesirable behaviours and these constituted by far the largest group of factors. Situational awareness was found to be deficient in all cases.

Historically TAWS in crafts have utilized low-resolution information representing the external environment to determine if a risk of collision exists. Such TAWS configured to utilize low-resolution environmental information may require crude methods to determine risk of collision of the craft in order to minimize the probability of false negatives. An intrinsic drawback of TAWS utilizing such methods to determine risk of collision of a craft is the probability of generating false positives. In a real world situation a TAWS presenting a high number of false positives as warnings may lead the user of a craft to occasionally ignore warnings, ignore all warnings or even disable the TAWS, whereby the user's situational awareness is significantly reduced. There is a demand to improve generation of warnings or instructions for collision avoidance in a craft.

SUMMARY

An object of the present disclosure is to provide a solution for determining an action for collision avoidance in a craft wherein some of the problems with prior art technologies are mitigated or at least alleviated.

The disclosure proposes a method for determining an action for collision avoidance in a craft. The method comprises obtaining object data comprising three-dimensional object data points, obtaining state data of the craft and determining at least one set of manoeuvre paths for the craft based on the obtained craft state data. The method further comprises determining a set of distance thresholds for the three-dimensional object data points based on the object data and comparing each set of manoeuvre paths with the object data and the set of distance thresholds. The set of manoeuvre paths is identified as a colliding set of manoeuvre paths when each path of the set of manoeuvre paths is at least partially within the corresponding distance threshold of at least one three-dimensional object data point. The method further comprises determining an action upon identification of at least one colliding set of manoeuvre paths.

By consideration of multiple escape options for a number of possible manoeuvre paths for the craft, the system may provide an improved way to determine collision risks in the environment and thereby limit the number of false warnings, thereby reducing the number of nuisance alerts as compared to prior art methods. An excessive number of nuisance alerts may cause the pilot to ignore the warnings and/or to disable the warning system. Hence, a reduced number of nuisance alerts may improve the safety of the craft.

By action for collision avoidance is meant an action in order to avoid collision with an object. Examples of actions are instructions for a lateral or vertical manoeuvre performed by the craft. In some examples, the action for collision avoidance comprises presenting a warning for an operator or pilot. The object data may relate to real world objects and terrain features, such as mountains or trees, buildings and other crafts or vehicles in the air, in the water, or on the surface. The object data may comprise data indicative of weather conditions, such as a thunderstorm, strong wind, low cloud or ash cloud.

By craft is meant a craft that can move in three dimensions in air or in water, i.e. an aircraft or watercraft. Examples of an aircraft is an airplane, a helicopter or unmanned aerial vehicle (UAV). An example of a watercraft is a submarine.

By object data is meant data relating to an external object or environmental condition. Object data may relate to object geometry, object orientation, object velocity, object path, object state, estimated object performance, object Identification Friend or Foe information, and/or at least one object threat zone. The object data may be obtained from databases and/or from sensors of the craft. As an alternative, in case the object is another craft, the object data may be transferred by the other craft itself. At least some object data may be obtained from a ground station. In some examples, object data comprises three-dimensional object data points, whereby a real or a virtual object in the environment may be represented by one or more three-dimensional object data points.

A three-dimensional object data point is indicative of a location in the environment that can be represented by three coordinates. In some examples, the location and geometry of an object in the environment may be represented by a plurality of three-dimensional object data points. In some examples a real world object may be represented by a single three-dimensional object data point with a corresponding distance threshold large enough to represent a volume overlapping said object, alternatively the object may be represented by a larger number of three-dimensional object data points each with smaller corresponding distance thresholds which together represent a volume overlapping said object.

By distance threshold is meant the distance from the three-dimensional data point to at least one other point in space surrounding the three-dimensional data point. The distance threshold may be determined based on the object data. For example, the distance threshold may be set larger for a moving object such as another craft than for a fixed object such as a mountain. The thresholds may be set with the same distance in all directions, or with a different distance for at least one direction or sector, such as in the x-, y- and z-directions, or any combination thereof.

For each point in time the three-dimensional object data points and the corresponding at least one distance threshold may be described by at least one volume, said volume will be referred to as an avoidance volume. Each path of a colliding set of manoeuvre paths enters or grazes the avoidance volume.

The term "state data" refers to information indicative of at least one quantity of a craft or an object, such as position, velocity or inertia. The obtained craft state data relates to data indicative of the present state of the craft, such as capacity of the engines, height, velocity etc. In some examples, object data comprises an object state data indicative of the state of another craft.

By manoeuvre path is meant a determined path indicative of a one- or multidimensional manoeuver allowable from a craft based on a corresponding determined craft performance, wherein the craft performance is based on the obtained craft state data. The determined craft performance may comprise a set of estimated values relating to the craft's ability to change velocity. A set of manoeuvre paths may comprise one manoeuvre path. In some examples, the set of manoeuvre paths for a given craft state represents a subset of all the allowable paths the craft could follow based on the corresponding craft performance. In some examples, the set of manoeuvre paths is selected from among the typically large number of possible paths, wherein the selection may be based on the type of craft and the intended operational environment. As the set of manoeuvre paths may be used to determine if the craft from a position relating to the end point of the first path segments of a set of manoeuvre paths is determined to collide with objects it may be reasonable to include at least one second path segment of a manoeuvre representing maximum yawing, and/or at least one second path segment of a manoeuvre representing maximum pitching. The set of manoeuvre paths may comprise a second path segment relating to the craft substantially maintaining its velocity.

The method according to claim 1, wherein each manoeuvre path of each set of manoeuvre paths comprises a first path segment and a second path segment, wherein for each set of manoeuvre paths each first path segment is the same, and wherein the end point of the first path segments of at least one set of manoeuvre paths is indicative of a position of the craft at least 1 second into the future.

The end point of the first path segments of the set of manoeuvre paths may be indicative of a possible future state of the craft. The second path segments of the set of manoeuvre paths may be indicative of escape manoeuvres by the craft performed from the corresponding end point of the first path segments.

Future state refers to a predicted craft state and may represents a possible craft state in the future, such as a state relating to the end point of the first path segments of a set of manoeuvre paths. Future state may comprise predicted values indicative of the velocity and the location of the craft. In some examples, a future state relates to the craft substantially maintaining velocity. Each future state may be considered as a starting point in time and space to initiate a set of escape manoeuvre paths, such as drastic manoeuvres to avoid a collision. The set of manoeuvre paths may be represented by the second path segments of each set of manoeuvre paths. If upon comparing the set of manoeuvre paths with object data and the corresponding distance thresholds and each second path segment is determined to be within the distance threshold of a three-dimensional object data point, then the set of manoeuvre paths is determined to be a colliding set of manoeuvre paths, whereby the corresponding future state is to be avoided. In these examples, the end point of the first path segments of a colliding set of manoeuvre paths may relate to a future state of the craft from which collision is considered unavoidable. Collison in this context relates to the craft traveling within the distance thresholds of the three-dimensional object data points, as it may be possible for a representation of the craft to move within the distance thresholds without the craft colliding with a physical object.

Comparing each path of the set of manoeuvre paths with three-dimensional object data points and their corresponding distance thresholds may be based on at least one predicted future position for each three-dimensional object data point.

According to some aspects, determining the set of distance thresholds is further based on the obtained craft state data.

By taking the obtained craft state data into account, it is possible to obtain a set of distance thresholds that correlates to the estimated performance of the craft.

According to some aspects, determining the at least one set of manoeuvre paths for the craft based is further based on the obtained object data.

By taking the obtained object data into account, it is possible to determine at least one set of manoeuvre paths wherein the end point of the first path segments of said set of manoeuvre paths relates to a location in the same direction as the location of at least one three-dimensional data point. In some examples, the craft approaching an environment with a higher number of objects in a first direction relative to the craft, as compared to the number of objects in a second direction, may cause an increased number of sets of manoeuvre paths towards the first direction. In some examples, this situation may cause an increased number of sets of manoeuvre paths towards the second direction.

According to some aspects, determining the set of distance thresholds further comprises searching the obtained object data for state data of at least one other craft, and, upon identifying state data of at least one other craft, determining distance thresholds for each three-dimensional object data point corresponding to the at least one other craft based on the identified state data of said other craft.

Thereby, an estimated performance based on the state data of the other craft(s) may be taken into account when determining the corresponding distance thresholds.

According to some aspects, determining at least one set of manoeuvre paths is further based on human piloting and/or human reaction times.

By determining at least one set of manoeuvre paths based on human piloting and/or human reaction times the determined the manoeuvre paths may better match the expected response of the operator or pilot than theoretically possible manoeuvre paths.

According to some aspects, determining a set of distance thresholds for the object data further comprises generating the avoidance volume, and wherein each set of manoeuvre paths is compared with the generated avoidance volume.

Generation of an avoidance volume may have the advantage of allowing a visualisation of the avoidance volume to be presented to the operator or pilot.

According to some aspects, determining at least one set of manoeuvre paths of the craft comprises determining at least three sets of manoeuvre paths of the craft, wherein the end point of the first path segments of at least three sets of manoeuvre paths are indicative of a position of the craft at least 1 second into the future,
wherein the end point of the first path segments of at least two sets of manoeuvre paths are indicative of a position of the craft at least 2 seconds into the future, and
wherein the end point of the first path segments of at least one set of manoeuvre paths is indicative of a position of the craft at least 3 seconds into the future. In some examples, at least one set of manoeuvre paths relate to the craft substantially maintaining the current velocity. In some examples, at least one set of manoeuvre paths relates to a predetermined set of manoeuvres, such as manoeuvres relating to moderate yawing or other manoeuvres typically performed during normal operation of the craft. In some examples, the first path segments of at least one set of manoeuvre paths relate to maintaining velocity and/or the predetermined set of manoeuvres.

According to some aspects, determining the action is based on an amount of time into the future relating to the end point of the first path segments of each colliding set of manoeuvre paths.

By the amount of time into the future is meant the difference between the present time and the point in time of the corresponding end point of the first path segments. In some examples, the end point of the first path segments is 1 seconds, 2 seconds, or 3 seconds into the future.

This has the advantage of allowing a warning to the operator or pilot to depend on the amount of time left until the future state relating to the end point of the first path segments may become reality. In some examples upon identifying a colliding set of manoeuvre paths a minor warning may be presented if the corresponding future state is 3 seconds into the future; a moderate warning may be presented if the corresponding future state is 2 seconds into the future; and a major warning may be presented if the corresponding future state is 1 second into the future.

According to some aspects, the method further comprises providing an instruction to perform an escape manoeuvre upon the amount of time into the future relating to the end point of the first path segments of at least one colliding set of manoeuvre paths being below a predetermined threshold. An escape manoeuvre may be a manoeuvre utilizing unusual attitude, such as a manoeuvre that changes the direction of the crafts velocity as rapidly as possible.

The advantage is this is allowing the action to be adjusted based on the probability for a collision. Hence, if there is a large risk of collision in the near future, a warning may be e.g. an aural alarm, whereas if the risk of collision is lower, the warning may be shown on a display.

The present disclosure also relates to a computer program product comprising a non-transitory computer-readable storage medium having thereon a computer program comprising program instructions. The computer program being loadable into a processor and configured to cause the processor to perform the method according to what is presented herein.

The computer program corresponds to the steps performed by the method discussed above and have all the associated effects and advantages of the disclosed method.

The present disclosure also relates to a system determining an action for collision avoidance in a craft. The system comprises control circuitry comprising a computer, wherein the control circuitry is arranged to communicate with an environment monitoring system providing object data relating to the environment outside the craft. The control circuitry is further arranged to communicate with a craft monitoring system monitoring the state of the craft. The computer is arranged to obtain object data comprising three-dimensional object data points from the environment monitoring system, obtain craft state data from the craft monitoring system and determine at least one set of manoeuvre paths for the craft based on the obtained craft state data. The computer is further arranged to determine for each set of manoeuvre paths, a set of distance thresholds for the three-dimensional object data points based on the object data, compare each set of manoeuvre paths with the object data and the set of distance thresholds. The set of manoeuvre paths is identified as a colliding set of manoeuvre paths when each path of the set of manoeuvre paths is at least partially within the corresponding distance threshold of at least one three-dimensional object data point. The computer is further arranged to determine an action upon determining at least one colliding set of manoeuvre paths.

The system corresponds to the steps performed by the method discussed above and have all the associated effects and advantages of the disclosed method.

According to some aspects, each manoeuvre path of each set of manoeuvre paths comprises a first path segment and a second path segment, wherein for each set of manoeuvre paths each first path segment is the same, and wherein the end point of the first path segments of at least one set of manoeuvre paths is indicative of a position of the craft at least 1 second into the future.

According to some aspects, the computer is arranged to provide an instruction based on the determined action.

The instruction provided by the computer may be presented as an aural message and/or as an image on a display. The instruction may further comprise escape path guidance. For example, the escape path guidance may be an aural instruction. Alternatively, the escape path guidance may be shown as a visible instruction on a display or be a combination of an aural instruction and visual instruction.

An advantage is that the instruction may contain a large amount of information, for example, the escape path may be shown on a display. A further advantage is that the pilot or operator may decide how the instructions should be presented, for example as an aural message and/or visual on a display depending on situation. The instruction may comprise comprehensive guidance for example including combined information of lateral and vertical directions of an escape manoeuver.

According to some aspects, the computer is arranged to determine the set of distance thresholds further based on the obtained craft state data.

By determining the set of distance thresholds based on the obtained craft state data, it is possible to obtain a set of distance thresholds more suitable for the estimated performance of the craft.

According to some aspects, the computer is arranged to obtain object data comprising state data of at least one other craft, and the computer is arranged to determine distance thresholds for each three-dimensional object data point corresponding to another craft based on the obtained state data of said other craft.

The other craft may be a friendly craft or a hostile craft. It may be possible to differ between friendly and hostile crafts, thereby determining different distance thresholds for friendly and hostile crafts.

The present disclosure also relates to an aircraft comprising an environment monitoring system, an aircraft monitoring system and a system according to what is presented herein.

By an environment monitoring system is meant e.g. sensors for monitoring the external environment, such as radar, ladar, infrared cameras, visual cameras, GPS, etc. In some examples, the environment monitoring system is arranged to obtaining information memory storage or via communication means. By an environment monitoring system, it is possible to monitor the environment surrounding the aircraft. Hence, the environment monitoring system enables monitoring of objects in the environment surrounding the aircraft.

By an aircraft monitoring system is meant a system for monitoring the aircraft the system is comprised within, such as status of the engines, velocity, aircraft control functionality etc.

The present disclosure also relates to a watercraft comprising an environment monitoring system, a watercraft monitoring system and a system according to what is presented herein.

By an environment monitoring system is meant e.g. sensors for monitoring the external environment, such as sonar, radar, etc. The environment monitoring system may further be arrange to determine the state of the water surrounding the craft, such as determining underwater streams. By an environment monitoring system, it is possible to monitor the environment surrounding the watercraft. Hence, the environment monitoring system enables monitoring of objects in the environment surrounding the watercraft.

By a watercraft monitoring system is meant a system for monitoring the watercraft the system is comprised within, such as status of the engines, velocity, steering control status etc.

DETAILED DESCRIPTION

Figure 1:
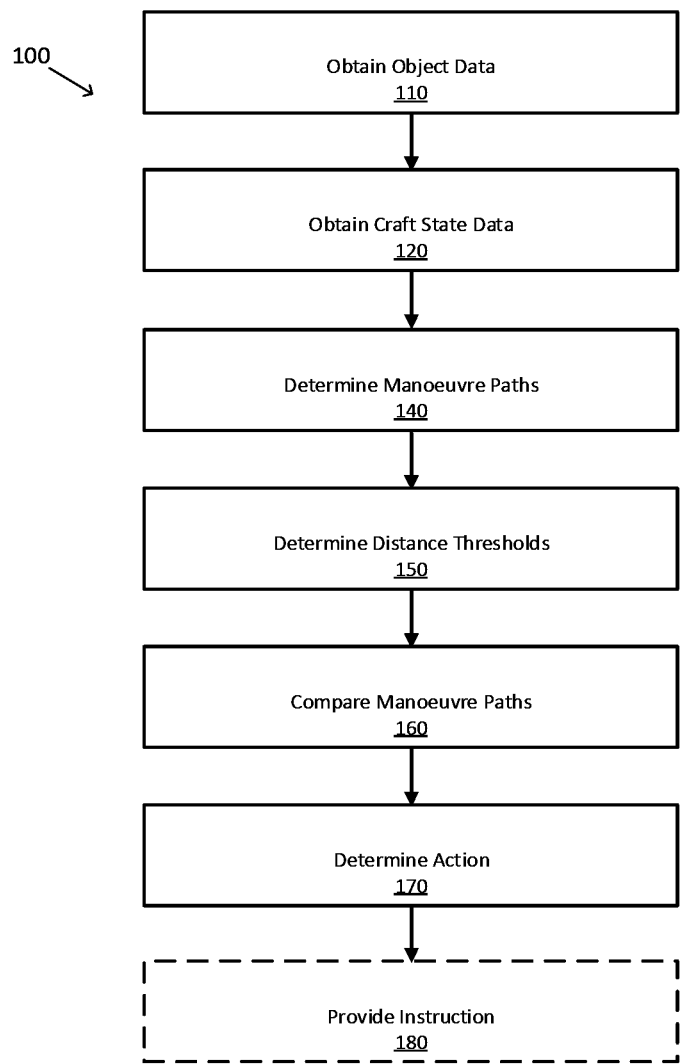
FIG. 1 shows schematically a method for determining an action for collision avoidance in a craft.

Throughout the figures, same reference numerals refer to same parts, concepts, and/or elements. Consequently, what will be said regarding a reference numeral in one figure applies equally well to the same reference numeral in other figures unless not explicitly stated otherwise.

FIG. 1 shows schematically a method for determining an action for collision avoidance in a craft. The method 100 comprises:

obtaining 110 object data comprising three-dimensional object data points, obtaining 120 state data of the craft, determining 140 at least one set of manoeuvre paths for the craft based on the obtained state data of the craft, determining 150 a set of distance thresholds for the three-dimensional object data points based on the object data, comparing 160 each set of manoeuvre paths with the object data and the set of distance thresholds, wherein the set of manoeuvre paths is identified as a colliding set of manoeuvre paths when each path of the set of manoeuvre paths is at least partially within the corresponding distance threshold of at least one three-dimensional object data point, and determining 170 an action upon identification of at least one colliding set of manoeuvre paths.

Each manoeuvre path of each set of manoeuvre paths comprises a first path segment and a second path segment, wherein for each set of manoeuvre paths each first path segment is the same, and wherein the end point of the first path segments of at least one set of manoeuvre paths is indicative of a position of the craft at least 1 second into the future.

Each set of manoeuvre paths may comprise at least two manoeuvre paths.

Each set of manoeuvre paths may comprise at least three, at least four, at least five, at least six, at least seven, at least eight, or at least nine manoeuvre paths.

By object data is meant data relating to an external object or environmental condition. Object data may relate to object geometry, object orientation, object velocity, object path, object state, estimated object performance, object Identification Friend or Foe information, and/or at least one object threat zone. The object data may be obtained from databases and/or from sensors of the craft. As an alternative, in case the object is another craft, the object data may be transferred by the other craft itself. At least some object data may be obtained from a ground station. In some examples, object data comprises three-dimensional object data points, wherein a real or a virtual object in the environment may be represented by one or more three-dimensional object data points.

For each point in time the three-dimensional object data points and the corresponding at least one distance threshold may be described as at least one volume, the term avoidance volume refers to said volume. Each path of a colliding set of manoeuvre paths enters or grazes the avoidance volume.

Obtaining 110 object data may comprise obtaining real-time environmental data from a set of sensors and/or obtaining pre-stored data from a non-transitory computer-readable storage medium. Obtaining 110 object data may comprise receiving object data from an external source, such as a ground station.

Obtaining 110 object data may comprise receiving data via wireless communication means.

Obtaining 110 object data may comprise obtaining information relating to object type, object geometry, object orientation, object velocity, object path, object state, estimated object performance, object Identification Friend or Foe information, and/or at least one object threat zone.

Obtaining 120 state data of the craft may comprise obtaining information relating to velocity, position, orientation, mass, and/or acceleration of the craft.

Obtaining 120 state data of the craft may comprise determining an estimated performance of the control system(s) for the craft's orientation and/or an estimated performance of the crafts propulsion system(s) based on the obtained state data of the craft.

Determining 140 at least one set of manoeuvre paths of the craft may comprise determining the end point of the first path segments for each set of manoeuvre paths indicative of a position of the craft a predetermined amount of time into the future. In some examples five sets of manoeuvre paths are determined, wherein each end point of the first path segments relate to a possible future state of the craft in 2 seconds, wherein the five sets of manoeuvre paths relate to the craft after 2 seconds of maintaining velocity, positive pitching, negative pitching, positive yawing and negative yawing respectively. In some examples four set of manoeuvre paths are determined, wherein the end point of the first path segments for each set of manoeuvre paths relate to the craft maintaining velocity 1, 2, 3 and 4 seconds into the future respectively.

The criteria for selecting the at least one set of manoeuvre paths to be determined may among other things depend on the estimated performance of the craft and the type of environment the craft is in and/or is expected to enter. A first type of craft may under typical operational conditions require a significant amount of time and/or distance to change velocity to avoid an obstacle, while a second type of craft may be more nimble under typical operational conditions and require significantly less forward planning to change velocity compared to the first type of craft. The type of environment the craft is in may in part be defined by the distance to the ground or the bottom of a body of water in said environment.

Determining 140 at least one set of manoeuvre paths of the craft may comprise determining at least three sets of manoeuvre paths of the craft, wherein the end point of the first path segments of at least three sets of manoeuvre paths are indicative of a position of the craft at least 1 second into the future, wherein the end point of the first path segments of at least two sets of manoeuvre paths are indicative of a position of the craft at least 2 seconds into the future, and wherein the end point of the first path segments of at least one set of manoeuvre paths is indicative of a position of the craft at least 3 seconds into the future.

Determining 140 at least one set of manoeuvre paths of the craft may comprise determining at least a first and a second set of manoeuvre paths of the craft, wherein the end point of the first path segments of the first set of manoeuvre paths is indicative of a position of the craft at 500 to 1 500 millisecond into the future, and wherein the end point of the first path segments of the second set of manoeuvre paths is indicative of a position of the craft at 1500 to 3 000 millisecond into the future.

Determining 140 at least one set of manoeuvre paths may comprise determining a set of manoeuvre paths comprising wherein the end point of the first path segments relates to a future state corresponding to the craft maintaining its current velocity, and wherein said end point relates to the craft at least 1 second into the future.

Determining 140 at least one set of manoeuvre paths may comprise determining at least one first path segments of the at least one set of manoeuvre paths based on a predetermined set of manoeuvre scenarios. In some examples the predetermined set of manoeuvre scenarios comprise manoeuvre scenarios relating to maintaining velocity, a predetermined positive pitching, a predetermined negative pitching, a predetermined positive yawing and a predetermined negative yawing respectively. In some examples determining 140 at least one set of manoeuvre paths may comprise first path segments for which the craft has a probability of entering above a predetermined probability threshold. In one of these examples, the probability of the first path segments relating to substantially maintaining velocity may be above the probability threshold, while the probability of the first path segments relating to aggressively pitching downwards may be below the probability threshold.

Determining 140 at least one set of manoeuvre paths for the craft may for each set of manoeuvre paths comprise second path segments relating to the maximum positive pitching, negative pitching, positive yawing and negative yawing of the craft from the corresponding set of manoeuvre paths.

Determining 140 at least one set of manoeuvre paths for the craft may for each set of manoeuvre paths comprise second path segments relating to substantially maintaining velocity of the craft.

Determining 140 at least one set of manoeuvre paths may comprise second path segments based on a determined performance of the craft in the corresponding end point of the first path segments said manoeuvre paths, wherein the determined performance is based on the a predicted future state of the craft at the end point of the first path segments.

Determining 140 at least one set of manoeuvre paths for the craft may each comprise a second path segment relating to a weighted average of a path relating to maintaining velocity of the craft and a path relating to the maximum positive pitching, negative pitching, positive yawing and negative yawing of the craft respectively from the corresponding end point of the first path segments.

Determining 140 at least one set of manoeuvre paths may be further based on human reaction times. In some examples, the manoeuvre paths may represent the manoeuvres of a human pilot or operator upon receiving a warning at the end of the first path segment of a set of manoeuvre paths. In some examples, the manoeuvre paths may be indicative of a human pilot or operator initiating a manoeuvre 500 milliseconds after reaching the end of the first path segment of a set of manoeuvre paths.

Determining 140 at least one set of manoeuvre paths may comprise determining at least one second path segment of at least one set of manoeuvre paths based on human reaction times.

Determining 150 the set of distance thresholds may further comprises searching the obtained object data for state data of at least one other craft, and, upon identifying state data of at least one other craft, determining distance thresholds for any three-dimensional object data point corresponding to the at least one other craft based on the identified state data of said other craft.

Determining 140 at least one set of manoeuvre paths may be further based on the obtained object data.

Determining 150 the set of distance thresholds may be further based on the obtained craft state data.

Determining 150 the set of distance thresholds may comprise determining for a three-dimensional object data point at least two distance thresholds, wherein each distance threshold is utilized for at least one direction and/or in at least one sector from the corresponding three-dimensional object data point. In some examples, a three-dimensional object data point represents at least part of an upper section of a building and has a first distance threshold in a vertical direction and a second distance threshold in a lateral direction, wherein the first and second distance threshold are of different length. In some examples the at least two distance thresholds of a three-dimensional object data point are determined based on an estimated ability to change velocity of the object relating to said three-dimensional object data point.

Determining 150 the set of distance thresholds for the object data may further comprise generating the avoidance volume, and wherein each set of manoeuvre paths may be compared 160 with the generated avoidance volume.

Comparing 160 each set of manoeuvre paths with the object data and the set of distance thresholds may be based on the three-dimensional object data points remaining stationary.

The comparison of manoeuvre paths with the object data and distance thresholds may comprise comparing multiple locations along each manoeuvre path, corresponding to multiple points in time, with time-dependent three-dimensional object data point locations, time-dependent distance threshold lengths and/or time-dependent distance threshold directions. The requirements for spatial resolution and time resolution of the comparison may among other things depend on the performance of the craft and the type environment the craft is in and/or is expected to enter. Several techniques may be suitable to perform said comparison and identify when a set of manoeuvre paths is a colliding set of manoeuvre paths.

Comparing 160 each set of manoeuvre paths with the object data and the set of distance thresholds may be based on at least one three-dimensional object data point having a velocity determined based on the object data, wherein the velocity is constant.

Comparing 160 each set of manoeuvre paths with the object data and the set of distance thresholds may be based on at least one three-dimensional object data point having a velocity determined based on the object data, wherein the velocity is a function of time.

Determining 170 the action may be based on the amount of time into the future the end point of the first path segments of the at least one identified colliding set of manoeuvre paths relates. In some examples, the action may be determined based on comparing a set of time thresholds with the amount of time into the future each end point of an identified colliding set of manoeuvre paths relates.

Any expected time delays may be included when determining the end point of the first path segments of each set of manoeuvre paths, determining the second path segments of each set of manoeuvre paths and determining the action. Therefore it should be noted that introducing an expected time delay, such as 500 milliseconds delay relating to human reaction times, may be accomplished by adjusting the way the manoeuvre paths, the action or any combination thereof is determined.

Determining 170 the action may be based on a determined probability of the craft state matching the end point of the first path segments of an identified colliding set of manoeuvre paths. In some examples for a craft currently maintaining velocity the determined probability of the craft state matching an end point of the first path segments of a first set of manoeuvre paths relating to maintaining velocity may be higher than the determined probability of the craft state matching an end point of the first path segments of a second set of manoeuvre paths relating to drastic change in velocity. In this example, identifying the second set of manoeuvre paths as colliding could result in a minor warning while identifying the first set of colliding manoeuvre paths as colliding could result in a major warning.

Determining 170 an action may be determined upon identification of at least two colliding sets of manoeuvre paths.

Determining 170 an action may be determined upon identification of at least a predetermined number of colliding sets of manoeuvre paths. The predetermined number may be a percentage of the total number of determined sets of manoeuvre paths.

The method may comprise determining 140 at least two sets of manoeuvre paths, and an action may be determined upon identification of at least a first number of colliding sets of manoeuvre paths, wherein the first number is one less than the total number of determined sets of manoeuvre paths.

The method may further comprise providing 180 instructions to perform an escape manoeuvre when the end point of the first path segments of the identified colliding set of manoeuvre paths relates to a point in time within a predetermined threshold.

The method may further comprise providing 180 instructions to the pilot or operator.

The instruction provided by the computer may be presented as an aural message and/or as an image on a display. The instruction may further comprise escape path guidance. For example, the escape path guidance may be an aural instruction. Alternatively, the escape path guidance may be shown as a visible instruction on a display or be a combination of an aural instruction and visual instruction.

The method may comprise determining 140 at least two sets of manoeuvre paths, and further comprise providing 180 instructions to perform an escape manoeuvre when less than a predetermined number of sets of manoeuvre paths are non-colliding sets of manoeuvre paths, wherein the instructions to perform an escape manoeuvre is based on at least one non-colliding set of manoeuvre paths.

Figure 2:
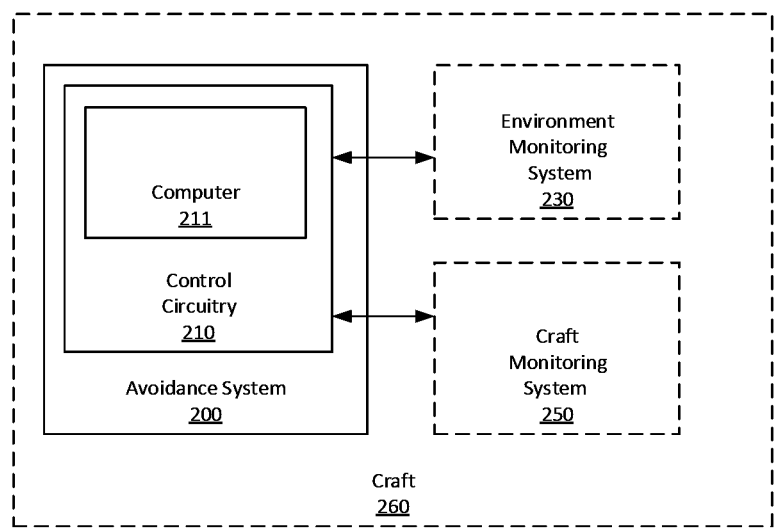
FIG. 2 depicts schematically a system for determining an action for collision avoidance in a craft.

FIG. 2 depicts schematically a system for determining an action for collision avoidance in a craft. The system 200 comprising control circuitry 210 comprises a computer 211. The control circuitry 210 is arranged to communicate with an environment monitoring system 230 providing object data relating to the environment outside the craft 260. The control circuitry 211 is arranged to communicate with a craft monitoring system 250 monitoring the state of the craft 260.

The computer 211 is arranged to
obtain object data comprising three-dimensional object data points from the environment monitoring system 230;
obtain craft state data from the craft monitoring system 250;
determine at least one set of manoeuvre paths for the craft 260 based on the obtained craft state data;
determine a set of distance thresholds for the three-dimensional object data points based on the object data;
compare each set of manoeuvre paths with the object data and the set of distance thresholds, wherein the set of manoeuvre paths is identified as a colliding set of manoeuvre paths when each path of the set of manoeuvre paths is at least partially within the corresponding distance threshold of at least one three-dimensional object data point; and
determine an action upon identification of at least one colliding set of manoeuvre paths.

Each manoeuvre path of each set of manoeuvre paths may comprise a first path segment and a second path segment, wherein for each set of manoeuvre paths each first path segment is the same, and wherein the end point of the first path segments of at least one set of manoeuvre paths is indicative of a position of the craft at least 1 second into the future.

Each set of manoeuvre paths may comprise at least two manoeuvre paths.

Each set of manoeuvre paths may comprise at least three, at least four, at least five, at least six, at least seven, at least eight, or at least nine manoeuvre paths.

The computer 211 may be arranged to determine the action based on the amount of time into the future of the end point of the first path segments of each of the at least one colliding set of manoeuvre paths. In some examples the action may be a minor warning for an end point of the first path segments of a colliding set of manoeuvre paths 5 seconds into the future relating to, while action may be a major warning for an end point of the first path segments of a colliding set of manoeuvre paths 1 second into the future.

The computer 211 may be arranged to provide an instruction based on the determined action.

The computer 211 may be arranged to provide an instruction to perform an escape manoeuvre upon the amount of time into the future relating to a corresponding colliding set of manoeuvre paths being below a predetermined time threshold.

The computer 211 may be arranged to obtain object data comprising state data of at least one other craft, and wherein the computer 211 may be arranged to determine distance thresholds for a three-dimensional object data point corresponding to the other craft based on the obtained state data of said other craft. In some examples the obtain object data comprising state data of at least one other craft is obtained from the corresponding other craft. In some examples the object data comprising state data of at least one other craft is obtained from a remote source, such as a communications system comprised in a ground station.

The computer 211 may be arranged to determine the set of distance thresholds further based on the obtained craft state data.

The computer 211 may determine at least one set of manoeuvre paths further based on human reaction times. In some examples, the manoeuvre paths may represent the manoeuvres of a human pilot or operator upon receiving a warning at the end point of the first path segments. In some examples, the manoeuvre paths may be indicative of a human pilot or operator initiating a manoeuvre 500 milliseconds after reaching the end point of the first path segments.

The computer 211 may determine at least one second path segment of at least one set of manoeuvre paths based on human reaction times.

The computer 211 may arranged to determine a set of distance thresholds for the object data and generate an avoidance volume, and the computer 211 may compare each set of manoeuvre paths with the generated avoidance volume.

The generated avoidance volume may be a volume changing as a function of time.

The computer 211 may be arranged to determine at least three sets of manoeuvre paths of the craft,
wherein the end point of the first path segments of at least three sets of manoeuvre paths are indicative of a position of the craft 260 at least 1 second into the future,
wherein the end point of the first path segments of at least two sets of manoeuvre paths are indicative of a position of the craft 260 at least 2 seconds into the future, and
wherein the end point of the first path segments of at least one set of manoeuvre paths is indicative of a position of the craft 260 at least 3 seconds into the future.

Figure 3:
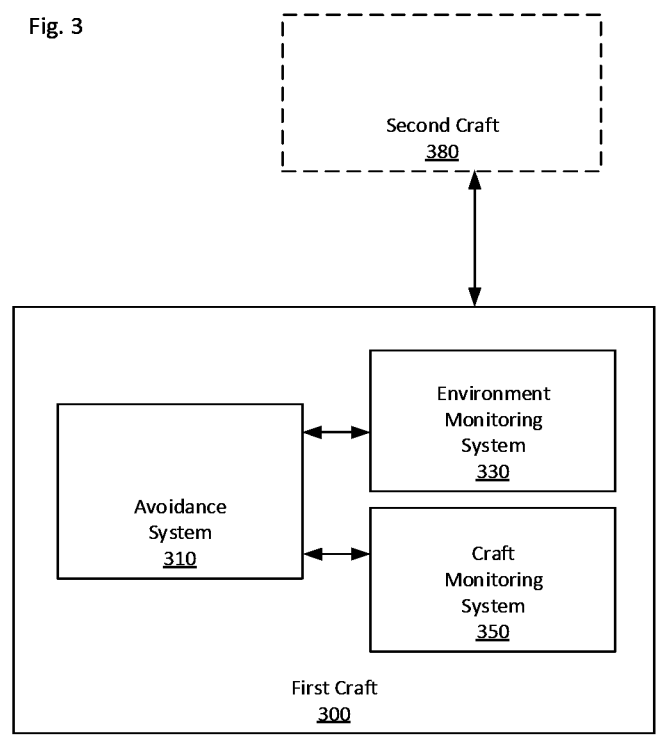
FIG. 3 depicts schematically a first craft comprising a system for determining an action for collision avoidance and a second craft.

FIG. 3 depicts schematically a first craft 300 comprising a system for determining an action for collision avoidance and a second craft 380. The first craft 300 comprises an example system 310 for determining an action for collision avoidance, an environment monitoring system 330, and a craft monitoring system 350 arranged to monitor the state of the first craft. The example system 310 for determining an action for collision avoidance may be the system according to FIG. 2. The example system 310 for determining an action for collision avoidance is arranged to communicate with the environment monitoring system 330 and the craft monitoring system 350. The environment monitoring system 330 is arranged to obtain state data of at least one other craft 380.

In some examples the first craft 300 refers to the own craft and the second craft 380 refers to the other craft.

In some examples, the environment monitoring system 330 is arranged to obtain state data of the second craft 380 by the first craft 300 communicating directly with the second craft 380. In some examples the environment monitoring system 330 is arranged to obtain state data of the second craft 380 by the first craft 300 communicating with a third party, such as a ground station or a third craft. The obtained state data of the second craft 380 may comprise an intended path of travel for the second craft 380.

The first craft 300 may be an aircraft comprising the system according to FIG. 2.

The first craft 300 may be a watercraft comprising the system according to FIG. 2.

Figure 4:
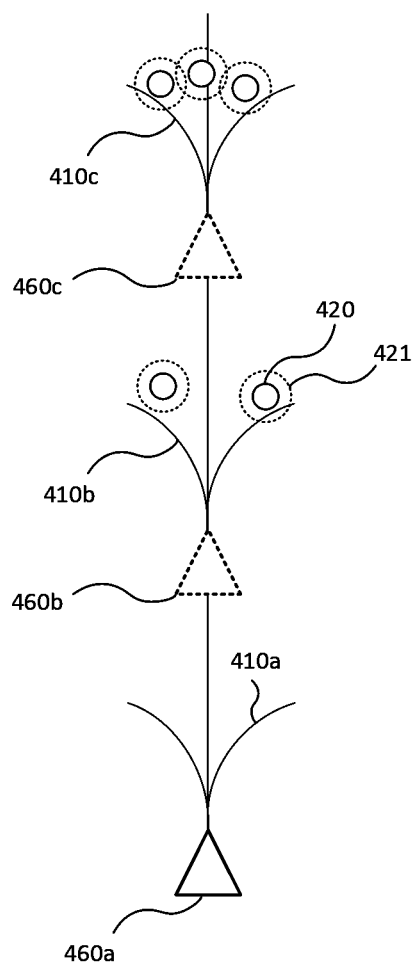
FIG. 4 illustrates an example of comparing manoeuvre paths with object data and distance thresholds.

FIG. 4 illustrates an example of comparing manoeuvre paths with object data and distance thresholds 421. The example shows a representation of a craft in a present state 460a, and five three-dimensional object data points 420 comprised in the object data. Around each three-dimensional object data points 420 is a circumference representing the corresponding distance thresholds 421. This example further illustrates three sets of manoeuvre paths 410a,b,c from the craft in the present state 460a. The first set of manoeuvre paths 410a comprises paths representing the craft performing escape manoeuvres in the immediate future.

The second set of manoeuvre paths 410b comprises paths comprising first path segments ending at a point representing a first future state 460b. In this example, the first future state 460b is a predicted state of the craft maintaining its velocity for 1 second. The second set of manoeuvre paths 410b comprises paths comprising a second path segment representing the craft performing escape manoeuvres from the first future state.

The third set of manoeuvre paths 410c comprises paths comprising a first path segment ending at a point representing a second future state 460c. In this example, the second future state 460c is a predicted state of the craft maintaining its velocity for 2 seconds. The third set of manoeuvre paths 410c comprises paths comprising a second path segment representing the craft performing escape manoeuvres from the second future state.

The escape manoeuvres representing the crafts ability to change velocity from each state 460a,b,c. In this example each set of manoeuvre paths 410a,b,c comprises one manoeuvre path relating to maintaining velocity and two manoeuvre paths relating to escape manoeuvres, turning right and turning left. In the example of FIG. 4 at least part of some sets of manoeuvre paths overlap, for example all paths of the second 410b and third set of paths 410c overlap in the parts of the paths between the present state 460a and the first future state 460b.

The object data points 420 and corresponding circumferences 421 may define a region associated with a risk of collision and/or may define a region that a collision avoidance system of a craft is arranged to avoid. Said region associated with a risk of collision may define an avoidance volume. In some examples, the pilot or operator is provided a visual presentation of said avoidance volume, such as an image in a display system.

Consider an example collision avoidance system arranged to compare sets of manoeuvre paths with the object data and the set of distance thresholds 421, wherein the set of manoeuvre paths is identified as a colliding set of manoeuvre paths when each path of the set of manoeuvre paths is at least partially within the corresponding distance threshold 421 of at least one object data point 420. Said example collision avoidance system would upon comparing the first 410a and second 410b set of manoeuvre paths corresponding to performing an escape manoeuvre at the present state 460a and the first future state 460b respectively with the object data points 420 and the corresponding circumferences 421 find paths in both sets of escape manoeuvre paths 410a,b that are outside the distance threshold 421 of all object data points 420.

Said example collision avoidance system would upon comparing the third set of manoeuvre paths 410c corresponding to performing an escape manoeuvre at the second future state 460c with the object data points 420 and the corresponding circumferences 421 find that each path of the third set of manoeuvre paths 410c is at least partially within the corresponding distance threshold 421 of at least one object data point 420, whereby the third set of manoeuvre paths 410c corresponding to the second future state 460c would be identified as a colliding set of manoeuvre paths.

In this example the third set of manoeuvre paths 410c comprises three manoeuvre paths, one manoeuvre path maintaining velocity from the end of the corresponding first path segment, and two manoeuvre path relating to turning right or left from the end of the corresponding first path segment. In this example, the action upon identifying a colliding set of manoeuvre paths representing performing an escape manoeuvre from a future state relating to maintaining velocity for 2 seconds may be a moderate warning for the pilot or operator.

In some examples, at least one object data point 420 relates to a moving object in the environment, whereby the example collision avoidance system may be arranged to compare the set of manoeuvre paths with at least one predicted path of each object data point 420 relating to a moving object in the environment and the corresponding distance threshold 421.

In some examples at least one object data point 420 relates to an object in the environment arranged to change velocity, such as a craft, whereby the example collision avoidance system may be arranged to compare the set of manoeuvre paths with at least one predicted path of each object data point 420 based on its corresponding ability to change velocity.

In some examples at least one object data point 420 relates to an object in the environment arranged to change velocity, such as a craft, whereby the example collision avoidance system may be arranged to determine the at least one predicted path for each object data point 420 based on its corresponding ability to change velocity.

In some examples, at least one object data point 420 each corresponds to at least two distance thresholds, wherein each distance threshold is utilized for at least one direction. In this example an object data point 420 representing at least part of the upper section of a building may have a first distance threshold 421 in a vertical direction and a second distance threshold 421 in a lateral direction, wherein the first 421 and second distance threshold 421 are different in length.

Figure 5A:
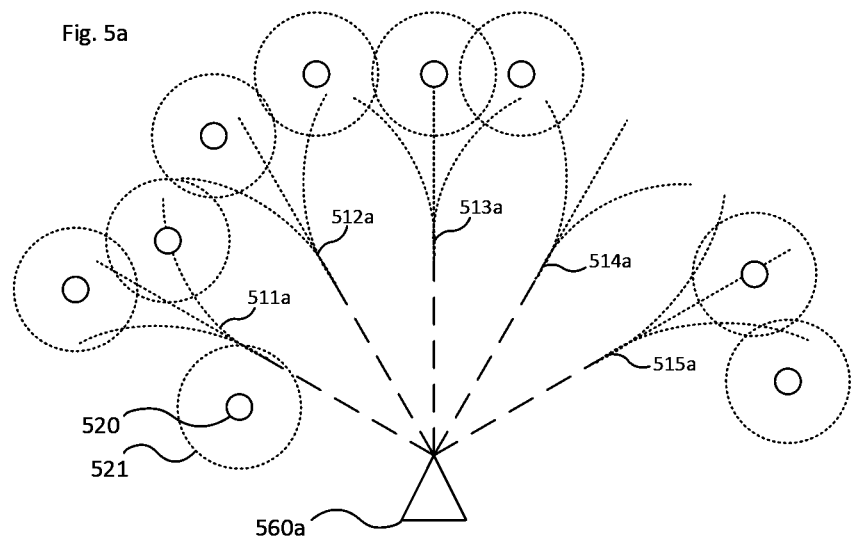
FIGS. 5a and 5b illustrate an example scenario of a craft using the system.
Figure 5B:
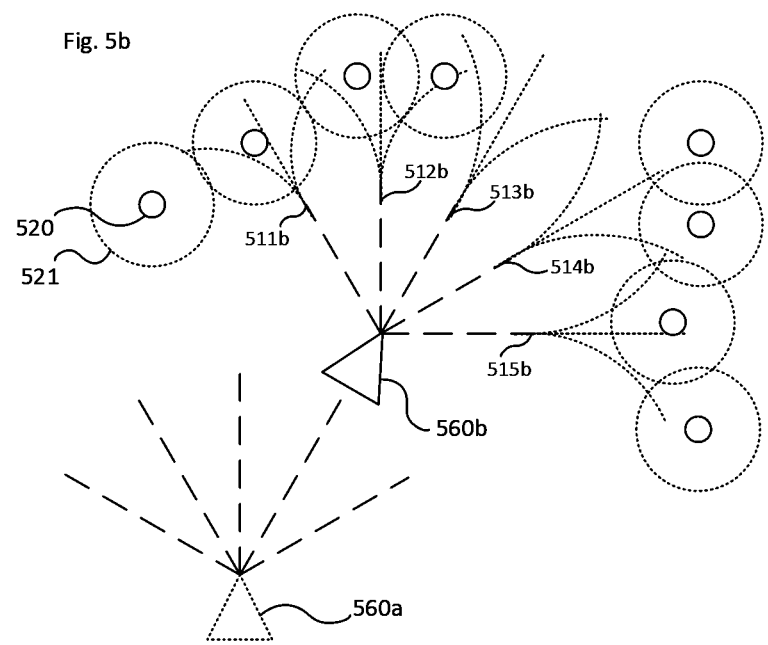

FIGS. 5a and 5b illustrates an example scenario of a craft using the system. An example of a craft using the system of the present disclosure in an example scenario will now be described. The use of the present disclosure is in no way limited by the described scenario example.

FIGS. 5a and 5b illustrate schematically a craft 560a,b and an environment comprising objects represented by three-dimensional object data points 520 and corresponding distance thresholds 521. The craft 560a comprises the system for determining an action for collision avoidance. In this example, the system for determining an action for collision avoidance is arranged to provide an instruction to perform a manoeuvre. In this example the system for determining an action for collision avoidance is arranged to provide an instruction to perform a manoeuvre when the number of colliding sets of manoeuvre paths greater or equal to the total number of sets of manoeuvre paths minus one, such as 7 colliding sets out of 8 sets, wherein the instruction to perform the manoeuvre is based on the non-colliding set of manoeuvre paths. Providing an instruction to perform a manoeuvre when the number of colliding sets of manoeuvre paths greater or equal to one minus the total number of sets of manoeuvre paths represents a high threshold for providing warnings or instructions and may be suitable for low flying military fighter crafts and racing crafts.

FIG. 5a illustrates the craft 560a in a first position. The system for determining an action for collision avoidance, from now on called the system, obtains object data comprising three-dimensional object data points 520 from a set of sensors. The system obtains craft state data comprising the position, velocity, estimated propulsion performance and estimated navigation performance of the craft 560a. The system determines five sets of manoeuvre paths 511a-515a, wherein each path comprises a first path segment and a second path segment, and wherein each set of manoeuvre paths 511a-515a comprises paths with the same first path segment. For example the three paths of the first set of manoeuvre paths 511a are identical for the first path segments, dashed line, until the end of the first segment after which the paths diverge, dotted line. The system determines a set of distance thresholds 521 based on the object data. These five sets of manoeuvre paths 511a-515a each comprise first path segments relating to the craft 560a maintaining velocity, moderate left and right turn, and significant left and right turn respectively. These five sets of manoeuvre paths 511a-515a each comprise second path segments relating to the craft maintaining velocity or performing an escape manoeuvre at the end point of the corresponding first path segment.

In some examples the set of manoeuvre paths 511a-515a further comprise at least one manoeuvre path (not shown) relating to a hybrid path between maintaining velocity and an escape manoeuvre. This hybrid path may allow the system to determine a non-colliding manoeuvre even when the paths relating to maintaining velocity and performing the escape manoeuvre are colliding manoeuvre paths.

In this example, during the time relating to the manoeuvre paths, the objects are stationary, the three-dimensional object data points 520 are stationary and the distance thresholds 521 do not change as a function of time.

The system compares each set of manoeuvre paths 511a-515a with the three-dimensional object data points 520 and the set of distance thresholds 521, wherein the set of manoeuvre paths 511a-515a is identified as a colliding set of manoeuvre paths when each path of the set of manoeuvre paths 511a-515a is at least partially within the corresponding distance threshold 521 of at least one three-dimensional object data point 520. In this example the first 511a, second 512a, third 513a, and fifth set of manoeuvre paths 515 are identified as colliding sets of manoeuvre paths. The system determines an action based on the identified colliding sets of manoeuvre paths. In this example, the system, upon identifying four out of five sets of manoeuvre paths to be colliding, determines an instruction relating to performing a manoeuvre based on the fourth set of manoeuvre paths 514a. In this example, the system provides an instruction to perform the manoeuvre, wherein the manoeuvre at least in part matches the first path segment of the manoeuvre paths of the fourth set of manoeuvre paths 514a.

FIG. 5b illustrates the craft 560b in a second position reached by the craft 560a in the first position upon performing the provided manoeuvre instruction.

The system obtains object data comprising three-dimensional object data points 520 from a set of sensors. The system obtains craft state data comprising the position, velocity, estimated propulsion performance and estimated navigation performance of the craft 560b. The system determines five sets of manoeuvre paths 511b-515b, wherein each path comprises a first path segment and a second path segment, and wherein each set of manoeuvre paths 511b-515b comprises paths with the same first path segment. The system determines a set of distance thresholds 521 based on the object data. These five sets of manoeuvre paths 511b-515b each comprise first path segments relating to the craft 560b maintaining velocity, moderate left and right turn, and significant left and right turn respectively. These five sets of manoeuvre paths 511b-515b each comprise second path segments relating to the craft maintaining velocity or performing an escape manoeuvre at the end point of the corresponding first path segment.

The system compares each set of manoeuvre paths 511b-515b with the three-dimensional object data points 520 and the set of distance thresholds 521, wherein the set of manoeuvre paths 511a-515a is identified as a colliding set of manoeuvre paths when each path of the set of manoeuvre paths 511a-515a is at least partially within the corresponding distance threshold 521 of at least one three-dimensional object data point 520. In this example the first 511b, second 512b, and fifth set of manoeuvre paths 515 are identified as colliding sets of manoeuvre paths. The system determines an action based on the identified colliding sets of manoeuvre paths. In this example, the system, upon identifying three out of five sets of manoeuvre paths to be colliding, determines that no instruction to perform a manoeuvre is to be provided.

In this example, the system may determine an action comprising presenting a notification relating to multiple manoeuvre paths being colliding manoeuvre paths. In this example, the system may determine an action comprising neither presenting a warning nor providing an instruction. In this example the system may determine an action comprising neither presenting a warning or providing an instruction based on the third set of manoeuvre paths 513b representing the craft 560b maintaining velocity being a non-colliding set of manoeuvre paths.

Figure 6:
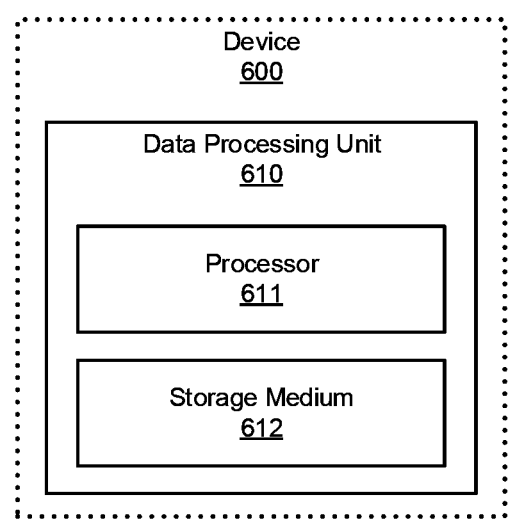
FIG. 6 depicts schematically a data processing unit comprising a computer program product.

FIG. 6 depicts schematically a data processing unit comprising a computer program product for determining an action for collision avoidance. FIG. 6 depicts a data processing unit 610 comprising a computer program product comprising a non-transitory computer-readable storage medium 612. The non-transitory computer-readable storage medium 612 having thereon a computer program comprising program instructions. The computer program is loadable into a data processing unit 610 and is configured to cause a processor 611 to carry out the method for determining an action for collision avoidance in a craft in accordance with the description of FIG. 1.

The data processing unit 610 may be comprised in a device 600. In some examples, the device 600 is the computation device comprised in the system described in FIG. 2.

The device 600 may be a personal computer, a server or a cloud server.

The device 600 may be comprised in a watercraft.

The device 600 may be comprised in an aircraft.

The device 500 may be part of a monitoring system in a watercraft.

The device 600 may be part of a monitoring system in an aircraft.

The invention claimed is:

1. A computer-implemented method for determining an action for collision avoidance in a craft, the method (100) comprises:
    obtaining (110) object data comprising three-dimensional object data points (420), wherein each data point (420) is indicative of a location of an object in an environment;
    obtaining (120) state data of the craft (260), wherein said state data at least comprises a velocity of said craft (260);
    determining (140), via at least one processor contained in a computer, at least one set of manoeuvre paths (410a,b,c) for the craft (260) based on the obtained craft state data, wherein each set of manoeuvre paths (410a,b,c) comprises at least two manoeuvre paths;
    determining (150), via the at least one processor, a set of distance thresholds (421) for the three-dimensional object data points (420) based on the object data;
    comparing (160), via the at least one processor, each set of manoeuvre paths (410a,b,c) with the object data and the set of distance thresholds (421), wherein the set of manoeuvre paths (410a,b,c) is identified as a colliding set of manoeuvre paths (410a,b,c) when each path of the set of manoeuvre paths (410a,b,c) is at least partially within the corresponding distance threshold (421) of at least one three-dimensional object data point (420);
    determining (170), via the at least one processor, an action upon identification of at least one colliding set of manoeuvre paths (410a,b,c); and
    implementing, via the at least one processor and upon execution of an instruction based on said determined action, a change in a path of the craft for collision avoidance,
    wherein:
        each manoeuvre path (410a,b,c) of each set of manoeuvre paths (410a,b,c) comprises a first path segment and a second path segment,
        for each set of manoeuvre paths (410a,b,c) each first path segment is the same, and the end point of the first path segments of at least one set of manoeuvre paths (410a,b,c) is indicative of a position of the craft (460b,460c) at least 1 second into the future.

2. The method according to claim 1, wherein determining (150) the set of distance thresholds (421) further comprises:
searching the obtained object data for state data of at least one other craft (380), and
upon identifying state data of at least one other craft (380), determining distance thresholds (421) for each three-dimensional object data point (420) corresponding to the at least one other craft (380) based on the identified state data of said other craft (380).

3. The method according to claim 1, wherein determining (150) the set of distance thresholds (421) is further based on the obtained craft state data.

4. The method according to claim 1, wherein determining the at least one set of manoeuvre paths for the craft based is further based on the obtained object data.

5. The method according to claim 1, wherein determining (140) at least one set of manoeuvre paths (410a,b,c) is further based on human piloting and human reaction times.

6. The method according to claim 1, wherein:
determining (140) at least one set of manoeuvre paths (410a,b,c) comprises determining at least a first, a second and a third set of manoeuvre paths (410a,b,c),
the end point of the first path segments of at least the first set of manoeuvre paths (410a,b,c) is indicative of a position of the craft (460b,460c) at least 1 second into the future,
the end point of the first path segments of at least the second set of manoeuvre paths (410a,b,c) is indicative of a position of the craft (460b,460c) at least 2 seconds into the future, and
the end point of the first path segments of at least the third set of manoeuvre paths (410a,b,c) is indicative of a position of the craft (460b,460c) at least 3 seconds into the future.

7. The method according to claim 1, wherein determining (170) the action is based on an amount of time into the future relating to the end point of the first path segments of each colliding set of manoeuvre paths (410a,b,c).

8. The method according to claim 7, wherein the providing (180) of the instruction comprises providing an instruction to perform an escape manoeuvre upon the amount of time into the future relating to a corresponding colliding set of manoeuvre paths (410a,b,c) being below a predetermined threshold.

9. A computer program product comprising a non-transitory computer-readable storage medium (612) having thereon a computer program comprising program instructions, the computer program being loadable into a processor (611) and configured to cause the processor (611) to perform the method (100) according to claim 1.

10. A system for determining an action for collision avoidance in a craft, the system (200) comprising control circuitry (210) comprising a computer (211) containing at least one processor, wherein the control circuitry (210) is arranged to communicate with an environment monitoring system (230) providing object data relating to the environment outside the craft (260), and wherein the control circuitry (211) is arranged to communicate with a craft monitoring system (250) monitoring the state of the craft (260), the processor is configured to:
obtain object data comprising three-dimensional object data points (420) from the environment monitoring system (230),
obtain craft state data from the craft monitoring system (250),
determine at least one set of manoeuvre paths (410a,b,c) for the craft (260) based on the obtained craft state data, wherein each set of manoeuvre paths (410a,b,c) comprises at least two manoeuvre paths;
determine a set of distance thresholds (421) for the three-dimensional object data points (420) based on the object data,
compare each set of manoeuvre paths (410a,b,c) with the object data and the set of distance thresholds (421), wherein the set of manoeuvre paths (410a,b,c) is identified as a colliding set of manoeuvre paths (410a,b,c) when each path of the set of manoeuvre paths (410a,b,c) is at least partially within the corresponding distance threshold (421) of at least one three-dimensional object data point (420),
determine an action upon determining at least one colliding set of manoeuvre paths (410a,b,c), and
implement, upon execution of an instruction based on the determined action, a change in a path of the craft for collision avoidance,
wherein each manoeuvre path (410a,b,c) of each set of manoeuvre paths (410a,b,c) comprises a first path segment and a second path segment, wherein for each set of manoeuvre paths (410a,b,c) each first path segment is the same, and wherein the end point of the first path segments of at least one set of manoeuvre paths (410a,b,c) is indicative of a position of the craft (460b, 460c) at least 1 second into the future.

11. The system according to claim 10, wherein the computer (211) is arranged to obtain object data comprising state data of at least one other craft (380), and wherein the computer (211) is arranged to determine distance thresholds (421) for each three-dimensional object data point (420) corresponding to the at least one another craft (380) based on the obtained state data of said other craft (380).

12. The system according to claim 10, wherein the computer (211) is arranged to determine the set of distance thresholds (421) further based on the obtained craft state data.

13. An aircraft comprising an environment monitoring system (230;330), an aircraft monitoring system (250;350) and the system (200;310) according to claim 10.

14. A watercraft comprising an environment monitoring system (230;330), a watercraft monitoring system (250;350) and the system (200;310) according to claim 10.

* * * * *